United States Patent [19]

Friedman et al.

[11] 4,254,013

[45] Mar. 3, 1981

[54] GREEN STRENGTH OF ELASTOMER BLENDS

[75] Inventors: Emil M. Friedman, Fairlawn; Richard G. Bauer, Kent, both of Ohio

[73] Assignee: The Goodyear Tire & Rubber Company, Akron, Ohio

[21] Appl. No.: 20,790

[22] Filed: Mar. 15, 1979

Related U.S. Application Data

[63] Continuation-in-part of Ser. No. 835,562, Sep. 22, 1977, abandoned, which is a continuation-in-part of Ser. No. 698,385, Jun. 21, 1976, abandoned.

[51] Int. Cl.³ .................. C08K 3/20; C08L 47/00
[52] U.S. Cl. ...................... 260/42.47; 152/330 R; 136/110 R; 260/5; 260/33.6 AQ; 260/42; 260/42.15; 260/42.37; 264/236; 264/DIG. 64; 525/196; 525/199; 525/200; 525/201; 525/209; 525/213; 525/215; 525/218; 525/220; 525/221; 525/231; 525/232; 525/233; 525/235; 525/237; 525/241
[58] Field of Search .............. 152/330; 264/236, 331, 264/DIG. 64; 156/110 R; 525/215, 196, 218, 199, 221, 235, 200, 201, 236, 209, 237, 213, 241, 220, 231, 232, 233; 260/5, 33.6 AQ, 42, 42.37, 42.15, 42.47

[56] References Cited

U.S. PATENT DOCUMENTS

| | | | |
|---|---|---|---|
| 2,880,186 | 3/1959 | Barth | 260/5 |
| 3,429,952 | 2/1969 | Nordsiek et al. | 525/192 |
| 3,475,362 | 10/1969 | Romanick et al. | 525/139 |
| 3,642,762 | 2/1972 | La Heis et al. | 525/139 |

FOREIGN PATENT DOCUMENTS

| | | | |
|---|---|---|---|
| 2215429 | 8/1974 | France | 525/192 |
| 425918 | 4/1975 | U.S.S.R. | 525/192 |

*Primary Examiner*—J. Ziegler
*Attorney, Agent, or Firm*—J. Y. Clowney; Daniel J. Hudak

[57] ABSTRACT

The green strength of elastomer blends of natural or synthetic cis-1,4-polyisoprene and synthetic elastomers is improved by adding to the chain of the synthetic elastomer an ionogenic compound. The said ionogenic compound can be incorporated into the chain of the synthetic elastomer through conventional polymerization with the monomers forming the synthetic elastomer, and the ionogenic group of the compound will be pendant from the chain or backbone of the elastomer. The ionogenic group is combined with a readily ionogenic metal base or salt. This combination yields blends which have greatly improved green strength as compared to rubber blends known to the art.

25 Claims, No Drawings

GREEN STRENGTH OF ELASTOMER BLENDS

CROSS-REFERENCE

This application is a continuation-in-part of our copending application bearing Ser. No. 835,562 filed Sept. 22, 1977 for "Improved Green Strength of Elastomer Blends," now abandoned which application was a continuation-in-part of an application bearing U.S. Ser. No. 698,385 filed on June 21, 1976 for "Improved Green Strength of Elastomer Blends," now abandoned.

BACKGROUND OF THE DISCLOSURE

The present invention relates to improved green strength properties of elastomer blends. More specifically, the present invention relates to the incorporation of an ionogenic compound into a synthetic elastomer wherein the ionogenic group is pendant from the backbone of the synthetic elastomer so that, upon combining with an ionizable metal base or salt, the green strength of elastomer blends of the synthetic elastomer with either natural or synthetic cis-1,4-polyisoprene is improved.

Science and technology in the elastomer field has improved to such an extent that synthetic elastomers have supplemented or replaced natural rubber to a great extent in the fabrication of tires and other rubber products. Stereo-specific polymers and particularly synthetic cis-1,4-polyisoprene have demonstrated physical properties similar to natural rubber and, thus, are capable of becoming a complete replacement for natural rubber. However, a major deficiency of synthetic elastomers, including synthetic cis-1,4-polyisoprene, is its lack of sufficient green strength required for satisfactory processing or building properties as in building tires. The abatement of this deficiency has long been sought by the art and would greatly facilitate the replacement of natural rubber which is solely produced in tropical climates.

The term "green strength," while being commonly employed and generally understood by persons skilled in the rubber industry, is nevertheless a difficult property to precisely define. Basically, it is that property of an unvulcanized polymer common in natural rubber which, under normal building conditions where multiple components are employed, results in little or no unwanted distortion of any of the assembled components. Thus, with synthetic polymers or copolymers, adequate green strength, that is the requisite mechanical strength for processing and fabricating operations necessarily carried out prior to vulcanization, is lacking. That is, generally the maximum or "peak" stress which the unvulcanized materials will exhibit during deformation is rather low. Thus, unvulcanized strips or other forms of the elastomer are often distorted during processing or building operations. Although numerous additives and compounds have been utilized in association with various elastomers and particularly with synthetic cis-1,4-polyisoprene, substantial improvement in green strength has generally not been accomplished.

Green strength has generally been measured by stress/strain curves of unvulcanized compounds. Usually, the green strength of a compound is indicated by various properties of the stress/strain curve; typically, the average slope beyond the the first peak or inflection of the curve, the (ultimate) tensile strength, and the ultimate elongation. Improvements in any one or more of these stress properties indicate improved green strength.

Among the various additive compounds or agents which have been utilized to improve green strength of synthetic rubber elastomers are numerous nitroso compounds as set forth in U.S. Pat. Nos. 2,457,331; 2,477,015; 2,518,576; 2,526,405; 2,540,596; 2,690,789; and 3,093,614. Additionally, various dioxime compounds have been utilized such as those set forth in U.S. Pat. Nos. 2,969,341; 3,037,954; and 3,160,595 as well as in British Patent No. 896,309. Yet another class of additives or compounds are the diesters of 5-norbornene as set forth in U.S. Pat. Nos. 3,817,883 and 3,843,613.

U.S. Pat. No. 3,898,983 to Brancaccio relates to improving the green strength of polyisoprene by reacting maleic acid therewith. A similar patent is that of Yamauchi et al, U.S. Pat. No. 3,897,403, which relates to a reaction between synthetic cis-1,4-polyisoprene and maleic anhydride. These patents are clearly different from the present invention in that applicants' compound is not incorporated in synthetic or natural cis-1,4-polyisoprene, but rather in a synthetic elastomer which is then blended with natural rubber or synthetic cis-1,4-polyisoprene.

Another prior art patent which relates to improved green strength is French Pat. No. 2,215,429 which utilizes very small amounts of various carboxylic acids with various polymers such as polybutadiene and SBR. However, at higher amounts of the carboxylic acids, the rubbers are rendered unprocessable. This patent does not relate to blends containing any cis-1,4-polyisoprene (natural or synthetic) which is often needed for its cured properties such as low heat buildup. Furthermore, at carboxylic acid concentrations which lead to processable rubbers, the improvement of properties is small.

In an article by Brown and Gibbs, it is disclosed that unsaturated carboxylic acids were copolymerized with olefins and dienes wherein at least 100 milliequivalents of the acid were utilized, *Rubber Chemistry and Technoloby*, Volume 28, Page 938 (1955). However, essentially, thermoplastic rubbers were produced which readily reacted with zinc oxide or other polyvalent metal compounds to form crosslinks which could not be readily worked on mills or in internal mixers using classical mixing processes for the preparation of rubber compounds. Additionally, this reference relates only to the use of dienes or olefins and contains no suggestion whatsoever of natural or synthetic cis-1,4-polyisoprene or of elastomer blends. It is moreover stated that "the physical properties of an unvulcanized carboxylic elastomer having a carboxyl content of 0.1 equivalent or less were essentially those of an analogous, noncarboxylic polymer." However, the present invention finds this statement to be untrue.

In various articles published in the magazine, *Soviet Rubber Technology*, very small amounts of carboxylic acids were utilized in a manner similar to that set forth in the French patent noted above. Specifically, in articles by Kovalev et al, Volume 31 (5), Page 4 (1975); Marandzhera, Volume 30(2), Page 51 (1971); and Smirnov, Volume 30(6), Page 3 (1971), isoprene rubbers as well as butadiene-styrene thermoplastic block copolymer rubbers were produced containing carboxyl or ester groups. In general, these rubbers showed improved green strength. However, the introduction of carboxyl or ester groups was usually carried out at a pressure of about 250 atmospheres of carbon monoxide, a highly toxic gas. Additionally, the carboxyl or ester groups are introduced into an already preformed polymer such as polyisoprene or butadiene-styrene. Also, none of these references relates to blends of synthetic elastomers with natural or synthetic cis-1,4-polyisoprene or of elastomer blends.

In an article appearing in the *Journal of Polymer Science*, Volume 8(6), Pages 599-605 (1952), elastomers are formed utilizing carboxylic acids and esters thereof. These compounds, when cured, have exceedingly high modulus at 300 percent extension but are totally unsuitable to mill. Furthermore, no green strength improvement was reported and no data was reported for uncured properties. This reference also is solely related to copolymers of butadiene, and not to blends including natural or synthetic isoprene rubbers. The thrust of the entire reference was towards improved oil resistance and low temperature properties.

U.S. Pat. No. 2,880,186 to Barth relates to dipping products such as gloves into a latex solution so that a strong elastic film is formed. The technique described by Barth is used to improve the tear resistance of elastic films. Thus, a metal is incorporated in some soluble form, for example, a metallic resinate. Moreover, the enhanced tear resistance is achieved by condensing carboxylic acid groups contained in the latex polymer either during or after deposition of a film with a polyacidic cation or basic radical on the shaped article. Barth furthermore, as in Table I, actually shows a decreased ultimate tensile strength in the vulcanizate upon the addition of the butadiene-acrylonitrile-methacrylic acid terpolymer; this certainly would not lead one skilled in the art to expect the result of the present invention of actually increasing the uncured tensile strength.

U.S. Pat. No. 3,429,952 to Nordsiek et al relates to a compound wherein the only improved property is that of increased tear resistance, Column 3, lines 35 through 66 with all of the other properties, including elasticity, being subject only to very minor changes. Nordsiek recognizes no improved green strength properties. Moreover, the amount of unsaturated carboxylic acid is well in excess of applicant's recited range.

U.S. Pat. No. 3,475,362 to Romanick et al relates to a rubber-based adhesive containing a carboxyl additive, an organo-metallic compound, and a solubilizing resin along with the use of standard rosins. Since this patent relates to an adhesive system, the organo-metallic material furthermore is incorporated in some soluble form. Very importantly, the adhesive or mastic before cure is totally unsuitable for making into a sheet of uncured (i.e. green) rubber usable in tire building and the like.

SUMMARY OF THE INVENTION

It is therefore an object of the present invention to improve the green strength of elastomer blends.

It is another object of the present invention to improve the green strength of elastomer blends, as above, wherein the blends comprise natural or synthetic cis-1,4-polyisoprene and synthetic elastomers.

It is a further object of the present invention to improve the green strength of elastomer blends, as above, wherein an ionogenic compound is incorporated into the backbone of the synthetic elastomer with the ionogenic group being pendant therefrom.

It is yet a further object of the present invention to improve the green strength of elastomer blends, as above, wherein said pendant ionogenic group readily reacts with the cation of an ionizable metal base or salt to form an ionic bond.

It is an additional object of the present invention to improve the green strength of elastomer blends, as above, wherein said compound containing said ionogenic group may be conveniently added during the polymerization of monomers forming the synthetic elastomer without any major temperature of other process changes.

It is still another object of the present invention to improve the green strength of elastomer blends, as above, wherein the synthetic elastomer is any elastomer prepared by a free radical process.

It is still another object of the present invention to improve the green strength of elastomer blends, as above, wherein the blend may be mixed or compounded with conventional compounding agents.

It is yet another object of the present invention to improve the green strength of elastomer blends, as above, wherein an ionizable metal base or salt may be conveniently added during the mixing or compounding of the elastomer blend without any major temperature or any process change.

It is still a further object of the present invention to improve the green strength of elastomer blends, as above, wherein large improvements of green strength properties are obtained which permit substituting synthetic cis-1,4-polyisoprene for natural rubbers.

It is still an additional object of the present invention to improve the green strength of elastomer blends, as above, wherein the blends may be utilized in making tires, conveyor belts and rubber hoses.

Generally, a prevulcanization process for preparing an elastomer blend for use in making tires or tire components, conveyor belts, or rubber hoses, comprises the steps of:

improving the prevulcanization or green strength of blends of (a) synthetic elastomer and (b) synthetic or natural cis-1,4-polyisoprene by adding an ionogenic compound to synthetic elastomer-forming monomers before polymerizing;

said ionogenic compound having the formula:

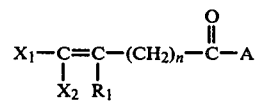

where $X_1$ and $X_2$ are selected from the class consisting of hydrogen, methyl, carboxyl, fluorine, chlorine, bromine and iodine;

where $R_1$ is H, $C_1$ through $C_{10}$, $-(CH_2)_n-COOH$ where n is 0 to 4, or a halogen selected from the class consisting of fluorine, chlorine, bromine, and iodine; and wherein A is OH, $NH_2$ or OM where M is a metal selected from Group 1A of the Periodic Table, or a monovalent metal capable of reacting with a metal base or salt;

said synthetic elastomer-forming monomers selected from the class consisting of at least one conjugated diene having from 4 to 10 carbon atoms, at least one conjugated diene having from 4 to 10 carbon atoms with at least one olefin having from 2 to 12 carbon atoms so that a multi-component polymer is formed, and combinations thereof;

polymerizing said ionogenic compound and said elastomer-forming monomers and forming a polymerized synthetic elastomer containing

groups pendant from the background of said synthetic elastomer, said pendant groups retaining their ionogenic functionality in said synthetic elastomer, the amount of said polymerized synthetic elastomer ranging from about 1 percent to about 99 percent by weight based upon the total weight of said polymer blend, the amount of said ionogenic unsaturated compound is such that said polymerized synthetic elastomer contains from about 8 to less than 58 milliequivelents of said

pendant group per 100 parts by weight of said polymerized synthetic elastomer;

adding and mixing a metal base or salt and a compound selected from the class consisting of natural or synthetic cis-1,4-polyisoprene to said polymerized synthetic elastomer and forming an elastomer blend having improved prevulcanization or green strength, said metal base or salt forming ionic bonds between said metal and said pendant ionogenic groups;

said metal base or salt having the formula MZ, wherein M is a metal selected from Group 2A or 2B of the Periodic Table or a polyvalent metal which is capable of reacting with said ionogenic group, and Z is an anion such that said metal base or said metal salt will react with two or more of said ionogenic groups;

the amount of said metal base or salt ranges from about 0.1 to about 10 parts by weight per 100 parts by weight of said blend;

after forming said elastomer blend having improved prevulcanized or green strength making and shaping said elastomer blend into a tire or a tire component, a conveyor belt, or a rubber hose, having good green strength so that said tire or said tire component, said conveyor belt, or said rubber hose maintains its shape prior to vulcanization.

Generally, an unvulcanized composition for making tires, conveyor belts, or rubber hoses, comprises:

a blend of synthetic elastomers having ionogenic functional groups, a metal base or salt, and synthetic or natural cis-1,4-polyisoprene, said blend having good prevulcanization or green strength;

said ionogenic functional group derived from an ionogenic compound having the formula:

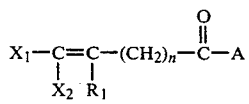

wherein $X_1$ and $X_2$ are selected from the class consisting of hydrogen, methyl, carboxyl, fluorine, chlorine, bromine and iodine, wherein $R_1$ is H, $C_1$ through $C_{10}$, $-(CH_2)_n-COOH$, wherein n is 0 to 4, or a halogen selected from the class consisting of fluorine, chlorine, bromine, and iodine; and wherein A is OH, $NH_2$ or OM, where M is a metal selected from Group 1A of the Periodic Table or a monovalent metal capable of reacting with said metal base or salt;

said synthetic elastomer made by polymerizing said ionogenic compound with synthetic elastomer-forming monomers and forming a polymerized synthetic elastomer containing

groups pendant from the backbone of said synthetic elastomer, said synthetic elastomer-forming monomers selected from the class consisting of at least one conjugated diene having from 4 to about 10 carbon atoms, at least one conjugated diene having from 4 to about 10 carbon atoms with at least one olefin having from 2 to 12 carbon atoms so that a multi-component polymer is formed, and combinations thereof, the amount of said polymerized synthetic elastomer ranging from about 1 to about 99 percent by weight based upon the total weight of said polymer blend, the amount of said ionogenic unsaturated compound is such that said polymerized synthetic elastomer contains from about 8 to less than 58 milliequivelents of said

pendant groups per 100 parts by weight of said polymerized synthetic elastomer, said metal base or salt having the formula MZ where M is a metal selected from Group 2A or 2B of the Periodic Table or a polyvalent metal which is capable of reacting with said ionogenic group, and Z is an anion such that said metal base or said metal salt will react with two or more of said ionogenic groups;

the amount of said metal base or salt ranging from about 0.1 to about 10 parts by weight per 100 parts by weight of said blend;

the amount of said natural or synthetic cis-1,4-polyisoprene ranging from about 99 to about 1 percent by weight based upon the total weight of said blend;

said blend suitable for use as tires or a tire component, a conveyor belt, or a rubber hose, having good green strength so that it maintains its shape prior to vulcanization.

DESCRIPTION OF THE PREFERRED EMBODIMENTS

According to the concepts of the present invention, improved green strength properties are obtained in elastomer blends of synthetic elastomers and natural or synthetic cis-1,4-polyisoprene. The increase in green strength largely arises from the creation of ionic bonds which join neighboring synthetic elastomer molecules. According to the present invention, an ionogenic compound, wherein the ionogenic group is pendant from the polymer chain or backbone, is not introduced into the natural or synthetic cis-1,4-polyisoprene but only into the synthetic elastomer. Generally, the compound containing the ionogenic group is an unsaturated acid as described hereinbelow. The reaction of the pendant ionogenic group with a metal base or salt forms the ionic bond.

The synthetic elastomers are polymers, terpolymers, etc., made from monomers generally considered by those skilled in the art capable of forming rubbers. More specifically, the monomers are selected from the group consisting of at least one conjugated diene having from 4 to about 10 carbon atoms, monomers of at least one conjugated diene having from 4 to about 10 carbon atoms and of at least one olefin having from 2 to about 12 carbon atoms so that a multi-component polymer (i.e., a copolymer, terpolymer, etc.) is formed, and combinations thereof. A preferred group of olefin compounds are the vinyl substituted aromatic hydrocarbons containing from 8 to about 12 carbon atoms and include styrene, alpha-methylstyrene, ortho-, para-, meta-methyl or ethylstyrene, and the like. Of the nonaromatic olefin compounds, the compounds containing 2 or 3 carbon atoms are preferred. Specific examples of olefins include ethene, propene, butene, pentene, and hexene. Concerning the diene compounds, the dienes having from 4 to 6 carbon atoms are preferred.

Specific synthetic elastomers which may be improved in the present invention include any of various well known elastomeric isomers (whether stereo-regular or not) of polybutadiene, polyisoprene, polypiperylene, polydimethylbutadiene, polychloroprene, copolymers or interpolymers of the dienes, for example poly(isoprene-co-butadiene), poly(butadiene-co-piperylene), and the like; terpolymers such as poly (butadiene-co-piperylene-co-isoprene), and the like. Additionally, copolymers of a diene and an olefin may be utilized such as poly(butadiene-co-styrene), poly(isoprene-co-styrene), poly(butadiene-co-propene), poly(butadiene-co-butene), poly(isoprene-co-alpha-methylstyrene), and the like. Preferred elastomers of the present invention include polyisoprene (any elastomeric isomer), polybutadiene (any elastomeric isomer), and the copolymer of styrene and butadiene.

The synthetic elastomers are prepared according to well known methods and processes as well known to those skilled in the art. Generally, a free radical process is utilized in the present invention since the unsaturated compound would tie up or kill the polymerization catalysts used in most cationic or anionic processes. Conventional and/or common free radical catalysts may be used in common or typical amounts as well known to those skilled in the art. The process may be carried in solution, bulk, suspension, or preferably in an emulsion.

The amount of synthetic elastomers utilized will range from about 1 to about 99 percent by weight with a range of from about 10 percent to about 50 percent being preferred based upon the total weight of the blend. When copolymers, terpolymers, etc., are prepared utilizing an olefin, the amount of the olefin may range from 0.1 to about 99 percent by weight. In other words, as is well known to those skilled in the art, so long as some diene monomer is contained in the monomeric mixture, the copolymers, terpolymers, etc., can later be vulcanized. Generally, the weight percent of the olefin monomer will usually range from 0.1 to about 55 percent with a more desirable range being from about 10 percent to about 40 percent. A preferred range of the olefin monomers such as styrene or alpha-methylstyrene is from about 15 percent to about 25 percent.

The above-described synthetic elastomer monomers, when polymerized in the presence of the ionogenic compound, result in a polymer having pendant ionogenic groups. In the present invention, the term "ionogenic" is used to mean a molecule or group which may readily ionize or readily react to form an ionic bond. Although the synthetic elastomer containing pendant ionogenic groups can be brought about by reacting diene polymers or diene copolymers with a suitable ionogenic compound, a preferred method is simply to add a polymerizable ionogenic monomer to the diene monomers or monomeric mixture containing both diene monomers and olefin monomers. According to this method, no additional step is necessary.

The polymerized synthetic elastomer containing the pendant ionogenic group is then blended as in a conventional compounding process with either natural or synthetic cis-1,4-polyisoprene and the polyvalent metal base or salt. The amount of either the natural or synthetic cis-1,4-polyisoprene may range from about 1 to about 99 parts by weight, with a preferred range generally being from about 50 to about 90 parts based upon the total weight of the blend. It is these blends of the synthetic elastomer with the natural or synthetic cis-1,4-polyisoprene and the metal base or salt which exhibit improved green strength.

Referring to the heretobefore described ionogenic compound which is polymerized with the synthetic elastomer monomers, it generally is an unsaturated carboxylic acid of the acrylic type. The ionogenic compound has the formula:

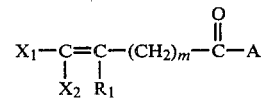

where $X_1$ and $X_2$ are hydrogen, methyl, carboxyl, or a halogen selected from the class consisting of fluorine, chlorine, bromine and iodine, $R_1$ is H, $C_1$ through $C_{10}$, $-(CH_2)_n-COOH$ where n is 0 to 4 or a halogen such as fluorine, chlorine, bromine and iodine, m is 0 to 4, and A is OH, $NH_2$ or OM where M is a Group 1A metal or another monovalent metal capable of reacting with a polyvalent metal base or salt. Examples of such metals include lithium, sodium, potassium, and the like. Preferably, A is hydroxyl. Desirably, $X_1$ and $X_2$ are hydrogen and $R_1$ is a hydrogen atom or a methyl group.

Preferably, the compound of the formula is acrylic acid or methacrylic acid. Other typical compounds of the formula which may be used include itaconic acid, fumaric acid, ethacrylic acid, propacrylic acid, butacrylic acid, and other substituted acrylic acids. Additionally, various acrylamides may be used, that is where $X_1$ and $X_2$ are hydrogen and $R_1$ has 1 to 10 carbon atoms and A is $NH_2$. Additionally, the various salts of the formula wherein the hydrogen of the hydroxyl group is replaced by a metal of the Group 1A elements of the Periodic Table may be used.

Generally, the amount of ionogenic functionality or group based upon milliequivalents of

group incorporated within the synthetic elastomer per 100 parts by weight of said synthetic elastomer is from about 8 to less than 58 milliequivalents. A more desirable range is from about 9 to about 35 milliequivalents, with a preferred range being from about 9 to about 23 milliequivalents.

In order to incorporate the desired amount of ionogenic group, at a particular conversion or extent of reaction, the amount of ionogenic compound charged can be readily calculated from tabulated reactivity ratios and conversion of reaction, by one skilled in the art. For example, in the case of the emulsion polymerization of butadiene, with or without styrene, or with or without isoprene, and with methacrylic acid, the reactivity ratios are such that if 10 milliequivalents of methacrylic acid are charged per 100 parts monomer and the polymerization carried to 60 percent conversion, more than 10 and most assuredly less than 16.7 (10/0.60=16.7) milliequivalents of methacrylic acid will be incorporated per 100 parts of polymer. Moreover, in the case of arylic acid, incorporation will be less efficient and for itaconic acid, it will still be less. In a solution polymerization, the efficiency of incorporating the above acids will generally be greater. Since polymerization occurs through the vinyl group of the ionogenic compound, as noted, the backbone of the synthetic elastomers will contain a pendant $$-\overset{\overset{\displaystyle O}{\|}}{C}-A$$

group.

After normal or conventional processing steps such as isolation and drying, the synthetic elastomers and the natural or synthetic cis-1,4-polyisoprene can be mixed and compounded according to conventional methods, and may contain conventional compounding agents in typical amounts. For example, carbon black; various fillers such as clays, silicas, and calcium carbonate; various plasticizers; various oils such as aromatic or naphthenic oils; various antioxidants; various crosslinking agents; various accelerators and the like, all may be added according to the needs of the particular blend known to those skilled in the art.

Desirably, during compounding of the blend, a readily ionizable metal salt or preferably a base (MZ) is added. The cation (M) of the metal salt may be selected from Groups 2A and 2B of the Periodic Table such as magnesium, calcium, barium, zinc, cadmium, and mercury, or any other polyvalent metal which is capable of reacting with the ionogenic group such as copper. Magnesium cations and zinc cations are highly preferred. The anion (Z) of the metal base or salt may be any anion such that said metal base or said metal salt will react with two or more ionogenic groups, as may be predicted by anyone skilled in the art using tabulated (nonacqueous) equilibrium constants, disassociation constants, and the like. More desirably, an hydroxide anion can be used or preferably an oxide anion to form a readily ionizable metal base. Thus, preferred metal bases or salts are zinc hydroxide and magnesium hydroxide, with zinc oxide and magnesium oxide being highly preferred. Zinc oxide is especially preferred since, as is well known to those skilled in the art, it has an additional beneficial effect unrelated to the above.

The metal base or salt when added to the blend chemically reacts with the ionogenic functionality or group to form ionic bonds according to the following equilibrium equation, which stoichiometry may be calculated by those skilled in the art, using equilibrium constants, disassociation constants, solubility curves, and the like for each compound $$MZ + -COOH \rightleftharpoons MCOO + MZ\ COO + MHZ$$

where the preferred use of hydroxyl for A in the pendant group $$-\overset{\overset{\displaystyle O}{\|}}{C}-A$$

is only for purpose of example. In the most preferred embodiment, the equation is:

$$MO + 2(-COOH) \rightleftharpoons M(-COO)_2 + HOH$$

where M is zinc or magnesium. The anion's reactivity with acids and the cation's willingness to react with the two carboxylate groups accelerate and shift the equilibrium of the reaction towards the desired ionic crosslinks. The ionic bonds formed between the polyvalent metal cation and two ionogenic groups impart a large green strength improvement so that an article such as a tire carcass, tire tread, a conveyor belt, a rubber hose, or the like retains its form or shape before cure or vulcanization with peroxide or sulfur, without chemically or physically altering the effects of the final cure.

The improvement of properties due to green strength and the improvement due to vulcanization arise from two completely different bonds. The sulfur or peroxide introduced for vulcanization, crosslinks the olefinic groups of the synthetic elastomer and natural or synthetic cis-1,4-polyisoprene backbones to form sulfur or peroxide bridges via covalent bonds whereas green strength is created by the presence of ionic bonds between the polyvalent metal cation and the ionogenic groups pendant from the synthetic elastomer backbone. In essence, the ionic bonds amount to a partial and meltable cure in that the properties are improved; however, the type of partial and meltable cure just noted does not inhibit processing since it is of a completely different nature than a vulcanization. Moreover, the present invention results in improved green strength and yet the cured (vulcanized) properties are substantially unaffected.

The chemical addition of the readily ionizable metal base into the blend does not require the temperatures necessary for vulcanization or any other substantial cure process. The metal base reacts with the blend, needing only enough heat energy to melt the blend into a fluid to facilitate proper mixing. Such temperature varies with heating time and usually ranges from 120° F. to about 200° F., or higher, if no sulfur is physically present. Temperatures above 200° F. with sulfur present may undesirably initiate vulcanization before shaping of the article.

The amount of metal base or salt added to the blend desirably exceeds the stoichiometric amounts necessary to support a reaction. Generally, between 0.1 parts and 10 parts by weight per 100 parts of blend is used. More desirably, between 1.0 or 1.5 parts and 5 parts is added.

The blends of the present invention find particular use for tires and tire components such as the carcass of a tire and may also be utilized for common industrial uses such as conveyor belts, rubber hoses, shoe soles, and the like.

The invention will be better understood by the following recipes, examples and data.

Synthetic elastomers were prepared in accordance with Example I. The quantities of monomer, methacrylic acid, and mercaptan were varied as set forth in Table I.

EXAMPLE I

PREPARATION OF LATEX (1) To 18.3 pounds of deionized water was 1.36 pounds of a 10 percent solution of the sodium salt of CALSOFT LAS-99, a linear dodecylbenzenesulfonic acid (manufactured by the Pilot Chemical Company) and 6.8 grams of $Na_2SO_4$, (2) To 227 ml of water was added 4 drops of sulfuric acid (66° Baume), 0.075 grams of $FeSO_4.7H_2O$, 10 ml of a 35 percent solution of VERSENE Fe-3 [a mixture of the tetrasodium salt of ethylenediaminetetra-acetic acid and the monosodium salt of N,N-di-(α-hydroxylethyl)glycine] manufactured by Dow Chemical Company, 0.75 grams of sodium formaldehyde sulfoxylate and 0.50 grams of $Na_2S_2O_4.2H_2O$.

(3) The mixture of paragraph 2 was added to the mixture of paragraph 1.

(4) An amount of methacrylic acid, styrene and the tertiary mercaptan of SULFOLE 120 (t-dodecylmercaptan as supplied by the Phillips Petroleum Company), as set forth in Table I, was added to a vessel and mixed.

(5) The mixture of paragraph 4 was then added to the mixture of paragraph 1.

(6) An amount of butadiene (caustic and water washed), as set forth in Table I, was then added to the mixture of paragraph 1.

(7) Then, 250 ml of styrene was mixed with 3.0 ml of p-menthane hydroperoxide.

(8) The mixture of paragraph 7 was then added to paragraph 1.

(9) A shortstop was prepared by mixing 200 ml of water, 20 ml of a 41 percent solution of sodium dimethyldithiocarbamate and 2 ml of an 85 percent solution of diethylhydroxylamine. This mixture was then added to the mixture of paragraph 1 when 60 percent conversion of the total monomers (i.e., of the synthetic elastomer-forming monomers, butadiene, styrene, and methacrylic acid), to the polymer was attained.

Polymerization was conducted at 60° F. at 190 rpm agitation. Polymerization was stopped by the addition of the shortstop set forth in paragraph 9, and the latex was steam stripped. The latex was coagulated by pouring it into two volumes of a 2 percent water solution of $Al_2(SO_4)_3.18H_2O$.

The monomer and modifier quantities for a control, as well as two tested elastomers, are as follows as set forth in Table I.

The control in Table I, as can be seen, had a Mooney of 67 whereas Polymer A had a Mooney of 60 and Polymer B has a Mooney of 56. Sheets ⅛ inch thick were molded at 300° F. for 30 minutes and 1/10 inch dumbbells were cut. Instron tensile tests were made at room temperature with an extension rate of 508 mm/minute (20inch/minute). The data obtained is also set forth in Table I.

TABLE I

| Quantity Charged: | CONTROL | POLYMER A | POLYMER B |
|---|---|---|---|
| Butadiene | 7.5 lb. | 7.44 lb. | 7.44 lb. |
| Styrene | 2.5 lb. (2.0 lb. + 250 ml.) | 2.48 lb. (1.98 lb. + 250 ml.) | 2.48 lb. (1.98 lb. + 250 ml.) |
| MAA | 0 | 34.0 g | 34.0 g |
| t-dodecylmercaptan | 16.0 ml. | 16.0 ml. | 18.0 ml. |
| Conversion | 54 percent | 56 percent | 59 percent |

DATA

| Terpolymer, (Polymer A) | | SBR Control | |
|---|---|---|---|
| Yield-Stress** | 348±7 (50.5±1.0) | Yield Stress** | 296±17(43.0±2.4) |
| Yield-Strain | 178±6 | Yield-Strain | 175±40 |
| At Break-Stress** | 669(96)* | At Break-Stress** | 350±180(50±25) |
| At Break-Strain | 1140* | At Break-Strain | 1140* |
| 300% Modulus** | 372±12 (54.0±1.8) | 300% Modulus** | 353±6(51.2±0.8) |
| Natural Rubber*** | | | |
| Yield-Stress** | 349±6 (50.6±0.8) | | |
| Yield-Strain | 234±10 | | |
| At Break-Stress** | 640±40 (93±6) | | |
| At Break-Strain | 810±50 | | |
| 300% Modulus** | 353±6 (51.2±0.8) | | |

*1140 percent was the maximum extension achievable by the Instron under the experimental conditions used. For this reason, values are short at break.
**Stress is expressed in kPa (=$10^3 N/m^2$) with its equivalent in PSI in parentheses; 1 PSI = 6.8948 kPa.
***#3 Pale Crepe As apparent, the terpolymer containing methacrylic acid in the backbone had much improved physical properties and was about as strong as the natural rubber.

EXAMPLE II

A control and Compound B (terpolymer) described in Example I were compounded with natural and synthetic cis-1,4-polyisoprene according to the following formulation:

| | (Wt.) |
|---|---|
| Natural* or Synthetic cis-PI | 70 |
| SBR Control or Compound B | 30 |
| Stearic Acid | 1.5 |
| Zinc Oxide | 3.5 |
| Mixture of Alkylated Diphenylamine | 2.5 |
| SRF Black | 15.0 |
| FEF Black | 25.0 |
| Naphthenic Rubber Process Oil | 3.0 |
| Coumarone Indene Resin | 2.0 |

*#1 Ribbed Smoked Sheet

The ingredients were mixed in a Brabender at 285° F. for 5 minutes. No cure occurred, since no sulfur was contained in the recipe. Sheets were molded and dumbbells cut as previously described with the thickness being 1/10 of an inch. Upon testing on an Instron tensile testing machine, wherein 1,200 percent was the maximum strain obtainable by the machine, the following data was obtained as set forth in Table II.

TABLE II

UNCURED STRESS/STRAIN DATA

| Pts. | Rubber | Pts. | | Yield Stress psi | Strain % | Modulus at Elongation of 300% psi | 600% psi | 900% psi | 1200% psi | Compound Mooney |
|---|---|---|---|---|---|---|---|---|---|---|
| 70 | Natural cis-1,4-polyisoprene | 30 | B | 60 | 96 | 90 | 149 | 197 | 242 | 59 |
| 70 | Natural cis-1,4-polyisoprene | 30 | Control | 47 | 76 | 60 | 100 | 139 | 172 | 53 |
| 70 | Synthetic cis-1,4-polyisoprene | 30 | B | 57 | 93 | 62 | 87 | 114 | 138 | |
| 70 | Synthetic cis-1,4-polyisoprene | 30 | Control | 56 | 71 | 56 | 66 | 67 | 65 | |

TABLE IIA

| Rubber | | $t_{90\%}$ (307° F.)+ | Time to 2 pts. Rise @ 270° F. |
|---|---|---|---|
| 70 N.R./30 | B | 11.9 minutes | 24.0 minutes |
| 70 N.R./30 | Control | 10.0 minutes | 17.0 minutes |
| 70 S.R./30 | B | 10.3 minutes | 16.0 minutes |
| 70 S.R./30 | Control | 8.9 minutes | 14.5 minutes |

From Table II, it is apparent that significant improvements in green strength properties were obtained when the synthetic elastomer containing methacrylic acid and zinc oxide were utilized in blends either with natural or synthetic cis-1,4-polyisoprene without unduly increasing the compound Mooney.

The rubber blends set forth in Table II were cured utilizing 2.1 parts by weight of sulfur, 0.7 parts by weight of AMAZ (N-oxydiethylene benzothioazole-2-sulfenamine) obtainable from The Vanderbilt Rubber Company, and 0.25 parts of an oil-treated symmetrical diphenylguanidine.

The rates of cure are shown in Table II A. Note that the improved synthetic elastomer is less scorchy than the control.

Sheets of the compound containing natural rubber and the improved synthetic elastomer were molded for 12 minutes while the other compounds were molded for 9½ minutes. Dumbbells were cut, as before, and tested on an Instron Tensile Tester, as before, and the following data was obtained.

TABLE III

| Pts. | Rubber | Pts. | | Modulus at Elongation of 100% | 300% | 600% |
|---|---|---|---|---|---|---|
| 70 | Natural cis-1,4-polyisoprene | 30 | B | 180 (psi) | 650 (psi) | 1,900 (psi) |
| 70 | Natural cis-1,4-polyisoprene | 30 | Control | 210 (psi) | 700 (psi) | 2,300 (psi) |
| 70 | Synthetic cis-1,4-polyisoprene | 30 | B | 240 (psi) | 850 (psi) | 2,200 (psi) |
| 70 | Synthetic cis-1,4-polyisoprene | 30 | Control | 240 (psi) | 930 (psi) | 2,400 (psi) |

It is apparent that the improvements in green strength, previously mentioned, were accomplished without increasing the cured modulus.

EXAMPLE III

In order to show the effects of an ionogenic compound as well as a metal base or salt upon the green strength of a realistic carcass compound, a latex was prepared in an essentially identical manner to that set forth in Example I, except for the following changes: (1) the amount of methacrylic acid was changed as indicated in Table V set forth below; (2) the butadiene-styrene ratio was adjusted so as to keep constant the mole percent of butadiene incorporated in the synthetic SBR copolymer using methods well known to those skilled in the art; and (3) the mercaptan was adjusted so as to obtain the desired Mooney viscosity of the oil extended, ionogenic synthetic elastomer. The steam-stripped latices were oil extended and salt-acid coagulated. The synthetic elastomer was then blended according to the following recipe set forth in Table IV.

TABLE IV

COMPOUNDING FORMULA*

| | |
|---|---|
| 70 parts by weight | Natural Rubber (#1 ribbed smoked sheet) or Natsyn 200 (synthetic cis-1,4-polyisoprene, manufactured by The Goodyear Tire and Rubber Company) |
| 41.25 parts by weight | SBR or ionogenic SBR (30 parts) oil (Shellflex 371), a relatively paraffinic, non-staining, medium process or extending oil (11.25 parts) |
| 2.0 parts by weight | Stearic Acid |
| 3.5 parts by weight | Zinc Oxide |
| 50 parts by weight | Carbon Black |
| 4.0 parts by weight | Shellflex 212, naphthenic-paraffinic, a processing oil manufactured by Shell |
| 1.0 parts by weight | Wingstay 100, an antioxidant manufactured by Goodyear |

*Adapted from The VanderBilt Rubber Handbook (N.Y., 1968), Page 457.

The compounding ingredients were mixed in a Brabender at 285° F. for 5 minutes. No cure occurred since sulfur was not utilized in the Recipe. As in Example II, the compound was molded into 1/10 inch thick sheets, cut into dumbbells, and tested, with the results set forth in Table V.

TABLE V

| | TYPE OF POLY-ISOPRENE (70 parts) | MILLIEQUIVALENTS OF MAA CHARGED PER 100 PARTS OF IONOGENIC SYNTHETIC ELASTOMER-FORMING MONOMERS | AMOUNT OF ZINC OXIDE | COMPOUND VISCOSITY | 400 PERCENT MODULUS |
|---|---|---|---|---|---|
| A. | Natsyn 200 | 0[1] | 0 parts | 84 ML-4 | 50 psi |
| B. | Natsyn 200 | 0[1] | 3.5 | 65 | 45 |
| C. | Natsyn 200 | Krynol LX* | 0 | 97 | 65 |
| D. | Natsyn 200 | Krynol LX* | 3.5 | 99 | 100 |

TABLE V-continued

| TYPE OF POLY-ISOPRENE (70 parts) | MILLIEQUIVALENTS OF MAA CHARGED PER 100 PARTS OF IONOGENIC SYNTHETIC ELASTOMER-FORMING MONOMERS | AMOUNT OF ZINC OXIDE | COMPOUND VISCOSITY | 400 PERCENT MODULUS |
|---|---|---|---|---|
| E. Natsyn 200 | 21 | 0 | 104 | 80 |
| F. Natsyn 200 | 35 | 0 | 114 | 140 |
| G. Natsyn 200 | 8.7 | 3.5 | 84 | 135 |
| H. Natsyn 200 | 21 | 3.5 | 85 | 285 |
| I. Natsyn 200 | 35 | 3.5 | 106 | 420 |
| J. Natural Rubber | 0[1] | 0 | 67 | 110 |
| K. Natural Rubber | 0[1] | 3.5 | 53 | 145 |
| L. Natural Rubber | Krynol LX* | 0 | 76 | 120 |
| M. Natural Rubber | Krynol LX* | 3.5 | 66 | 180 |
| N. Natural Rubber | 21 | 0 | 77 | 135 |
| O. Natural Rubber | 35 | 0 | 106 | 215 |
| P. Natural Rubber | 8.7 | 3.5 | 72 | 240 |
| Q. Natural Rubber | 21 | 3.5 | 67 | 440 |
| R. Natural Rubber | 35 | 3.5 | 97 | 700 |

*Krynol LX is an oil-extended "high green strength" styrene-butadiene rubber manufactured by Polysar
[1]PLIOFLEX 1778Y, a styrene-butadiene rubber manufactured by Goodyear As apparent from Table V, the addition of zinc oxide to Controls A and J (i.e., B and K) resulted in very little improvement in green strength as measured by 400 percent modulus. The inclusion of methacrylic acid in the synthetic elastomer did increase the green strength as shown by E, F, N and O. However, when methacrylic acid was utilized in conjunction with zinc oxide, vastly improved green strengths were obtained, as shown by G, H, I, P, Q and R. Such results are certainly much greater than any cumulative result of either the methacrylic acid or the zinc oxide.

Compounds of Krynol LX, a high green strength styrene-butadiene rubber manufactured by Polysar, had very poor green strength when compared with the compounds of the present invention. This may be seen by comparing: (1) Example C to E or F; (2) Example D to H, I or J; (3) Example L to N or O; (4) Example M to P, Q or R.

EXAMPLE IV

In order to show the effects of an ionogenic compound in the polymerization recipe upon the hysteresis of the compounded rubber, polymers were prepared with various contents of methacrylic acid, as in Example III and compounded in a standard radial carcass formulation.

The various compounds set forth in Table VI were tested for a Mooney viscosity (ML4 at 212° F.) and the sulfur-vulcanized at 310° F. for 25 minutes. The formulations set forth in Table VI were tested for a pendulum rebound (hot) according to ASTM Test No. D-1054-66 in order to check the cured properties. The results achieved are set forth in Table VI.

TABLE VI

| METHACRYLIC ACID CONCENTRATION | | | |
|---|---|---|---|
| CHARGED* | MAXIMUM POSSIBLE AMOUNT INCORPORATED** | MOONEY VISCOSITY AT 212° F. | PENDULUM REBOUND (ASTM D 1054–66) |
| 0 | 0 | 42 | 84.8 percent |
| 0 | 0 | 42 | 86.6 |
| 0 | 0 | 42 | 86.0 |
| 8.7 | 14.5 | 40 | 83.0 |
| 8.7 | 14.5 | 43 | 83.6 |
| 8.7 | 14.5 | 36 | 84.8 |
| 14 | 23 | 32 | 84.8 |
| 21 | 35 | 50 | 79.4 |
| 35 | 58 | 21 | 68.5 |

TABLE VI-continued

| METHACRYLIC ACID CONCENTRATION | | | |
|---|---|---|---|
| CHARGED* | MAXIMUM POSSIBLE AMOUNT INCORPORATED** | MOONEY VISCOSITY AT 212° F. | PENDULUM REBOUND (ASTM D 1054–66) |
| 35 | 58 | 66 | 76.5 |

*Milliequivalents methacrylic acid/100 gm. monomer
**Milliequivalents methacrylic acid/100 gm. polymer As apparent from Table VI, the pendulum rebound decreases with increasing amounts of charged ionogenic compound, thus indicating a more hysteretic material. Moreover, when the maximum amount of ionogenic compound incorporated was 58 milliequivalents, the pendulum rebound averaged about 72 percent. This indicates a poor product with regard to a tire carcass, in that such a hysteretic rubber will cause undue heat buildup during use, leading to ensuing degradation of the carcass as well as premature tire failure. As described in the specification, charging 35 milliequivalents of methacrylic acid per 100 parts of total monomer results in more than 35 milliequivalents but most assuredly less than 58 milliequivalents of methacrylic acid per 100 parts of polymer being incorporated in the synthetic elastomer. Thus, the amount of ionogenic compound incorporated is desirably less than 35 milliequivalents, favorably less than 21 milliequivalents, and preferably 14 milliequivalents or less.

While in accordance with the patent statutes, the preferred embodiments have been illustrated and described in detail, it is to be understood that the invention is not limited thereto; the scope of the invention being measured by the score of the attached claims.

What is claimed is:

1. A prevulcanization process for preparing an elastomer blend for use in making tires or tire components, comprising:
   improving the prevulcanization of green strength of blends of (a) synthetic elastomers and (b) synthetic or natural cis-1,4-polyisoprene by
   adding an amount of an ionogenic compound to synthetic elastomer-forming monomers before polymerizing such that the amount of said ionogenic compound incorporated in said synthetic elastomer after polymerization ranges from about 8 to 58 milliequivalents per 100 parts by weight of said synthetic elastomer;

said ionogenic compound having the formula:

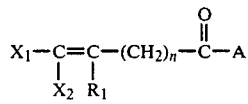

where $X_1$ and $X_2$ are selected from the group consisting of hydrogen, methyl, carboxyl, fluorine, chlorine, bromine and iodine;

where $R_1$ is H, $C_1$ through $C_{10}$ alkyl, $-(CH_2)_n-COOH$ where n is 0 to 4, or a halogen selected from the group consisting of fluorine, chlorine, bromine, and iodine; and where A is OH, $NH_2$ or OM where M is a metal selected from Group 1A of the Periodic Table, or a monovalent metal capable of reacting with a metal base or salt;

said synthetic elastomer-forming monomers selected from the group consisting of at least one conjugated diene having from 4 to 10 carbon atoms, at least one conjugated diene having from 4 to 10 carbon atoms with at least one olefin having from 2 to 12 carbon atoms so that a multi-component polymer is formed, and combinations thereof;

polymerizing said ionogenic compound and said elastomer-forming monomers and forming a polymerized synthetic elastomer containing from about 8 to 58 milliequivalents of

groups pendant from the backbone of said synthetic elastomer, said pendant groups retaining their ionogenic functionality in said synthetic elastomer, the amount of said polymerized synthetic elastomer ranging from about 1 percent to about 99 percent by weight based upon the total weight of said polymer blend, adding a compound selected from the group consisting of natural or synthetic cis-1,4-polyisoprene to said polymerized synthetic elastomer and forming an elastomer blend;

adding and mixing a metal base or salt, said metal base or salt having the formula MZ, wherein M is a metal selected from Group 2A or 2B of the Periodic Table or a polyvalent metal which is capable of reacting with said ionogenic group, and Z is an oxide or hydroxide anion such that said metal base or said metal salt will react with two or more of said ionogenic groups;

reacting said metal base or salt with said 8 to about 58 milliequivalents of said pendant

groups per 100 parts by weight of said synthetic polymer; and forming ionic bonds between said metal and said pendant ionogenic

groups and thereby improving the green strength of said blend of said polymerized synthetic elastomers and said natural or synthetic polyisoprene;

carrying out said reaction and the formation of said ionogenic bond between said metal base or salt and said pendant

groups at a temperature below a vulcanizing temperature so that vulcanization is prevented;

the amount of said metal base or salt ranging from about 0.1 to about 10 parts by weight per 100 parts by weight of said blend; after forming said elastomer blend having improved prevulcanized or green strength, making and shaping said elastomer blend into a tire or a tire component having improved green strength, and retaining the shape via said improved green strength of said tire or said tire component until vulcanization.

2. A process according to claim 1, wherein said dienes have from 4 to 6 carbon atoms and wherein said olefins are vinyl substituted aromatic compounds having from 8 to 12 carbon atoms.

3. A process according to claim 2, wherein the amount of said synthetic or natural cis-1,4-polyisoprene ranges from about 50 to about 90 percent by weight and said polymerized synthetic elastomer ranges from about 10 percent to about 50 percent by weight based upon the total weight of said blend.

4. A process according to claim 3, wherein the amount of said olefin in said synthetic elastomer ranges from about 0.1 to about 55 percent by weight.

5. A process according to claim 4, wherein said ionogenic compound is selected from the class consisting of acrylic acid or methacrylic acid, itaconic acid, fumaric acid, ethacrylic acid, propacrylic acid, and butacrylic acid;

wherein said metal of said metal base is zinc or magnesium;

oxide of said metal base is hydroxide or oxide; and wherein the amount of said metal base ranges from about 1.5 to about 5 parts by weight.

6. A process according to claim 5, wherein said synthetic elastomer is selected from the class consisting of poly(butadiene-co-styrene), polybutadiene, polypiperylene, polyisoprene, poly(butadiene-co-piperylene), polychloroprene, and poly(butadiene-co-alpha-methylstyrene), and wherein the amount of said ionogenic compound is such that said polymerized synthetic elastomer contains from about 9 to about 35 milliequivalents of said

pendant group per 100 parts by weight of said polymerized snythetic elastomer.

7. A process according to claim 6, wherein compounding agents are added to said blend.

8. A process according to claim 7, wherein said compounding agents are selected from the class consisting of carbon black, oil, clays and silica.

9. A process according to claim 6, wherein said unsaturated compound is selected from the class consisting of acrylic acid and methacrylic acid, wherein said metal of said metal base is zinc or magnesium, oxide of said metal base or said metal salt is hydroxide and oxide, and wherein the amount of said metal base or salt ranges from about 2 to about 5 parts by weight.

10. A process according to claim 9, wherein the amount of said olefin ranges from about 10 to about 40 percent by weight; and
heating said blend containing said metal salt to a temperature of from about 50° F. to about 200° F.

11. A process according to claim 10, wherein said synthetic elastomer is selected from the class consisting of poly(butadiene-co-styrene), polybutadiene, and polyisoprene, wherein said metal base is zinc oxide or magnesium oxide, and wherein the amount of said ionogenic compound is such that said polymerized synthetic elastomer contains from about 9 to about 23 milliequivalents of said

pendant group per 100 parts by weight of said polymerized synthetic elastomer.

12. A process according to claim 9, wherein compounding agents are added to said blend.

13. A process according to claim 1, wherein said adding of said metal base or salt occurs simultaneously with said adding of said compound selected from the class consisting of natural or synthetic cis-1,4-polyisoprene.

14. A process according to claim 1, wherein said adding of said metal base or salt occurs before said adding of said compound selected from the class consisting of natural or synthetic cis-1,4-polyisoprene.

15. A process according to claim 1, wherein said adding of said metal base or salt occurs after said adding of said compound selected from the class consisting of natural or synthetic cis-1,4-polyisoprene.

16. An unvulcanized composition for making tires or tire components, comprising:
a blend of synthetic elastomers having ionogenic functional groups, a metal base or salt, and synthetic or natural cis-1,4-polyisoprene, said blend having good prevulcanization or green strength;
said ionogenic functional group derived from an ionogenic compound having the formula:

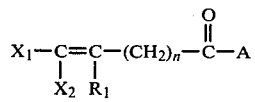

wherein $X_1$ and $X_2$ are selected from the group consisting of hydrogen, methyl, carboxyl, fluorine, chlorine, bromine and iodine,
wherein $R_1$ is H, $C_1$ though $C_{10}$ alkyl, $-(CH_2)_n-COOH$, wherein n is 0 to 4, or a halogen selected from the group consisting of fluorine, chlorine, bromine, and iodine; and
wherein A is OH, $NH_2$ or OM, where M is a metal selected from Group 1A of the Periodic Table or a monovalent metal capable of reacting with said metal base or salt;
said synthetic elastomer made by polymerizing said ionogenic compound with synthetic elastomer-forming monomers and forming a polymerized synthetic elastomer containing

groups pendant from the backbone of said synthetic elastomer, said synthetic elastomer-forming monomers selected from the group consisting of at least one conjugated diene having from 4 to about 10 carbon atoms, at least one conjugated diene having from 4 to about 10 carbon atoms with at least one olefin having from 2 to 12 carbon atoms so that a mulit-component polymer is formed, and combinations thereof, the amount of said polymerized synthetic elastomer ranging from about 1 to about 99 percent by weight based upon the total weight of said polymer blend, the amount of said ionogenic unsaturated compound is such that said polymerized synthetic elastomer contains from about 8 to less than 58 milliequivalents of said

pendant groups per 100 parts by weight of said polymerized synthetic elastomer,
said metal base or salt having the formula MZ where M is a metal selected from Group 2A or 2B of the Periodic Table or a polyvalent metal which is capable of reacting with said ionogenic group, and Z is an oxide or hydroxide anion such that said metal base or said metal salt will react with two or more of said ionogenic groups;
said metal base having been reacted with said 8 to less than 58 milliequivalents of said previously

groups so that ionogenic bonds are formed between said metal and adjacent synthetic elastomers and said blend has green strength;
said blend being unvulcanized;
the amount of said metal base or salt ranging from about 0.1 to about 10 parts by weight per 100 parts by weight of said blend;
the amount of said natural or synthetic cis-1,4-polyisoprene ranging from about 99 to about 1 percent by weight, based upon the total weight of said blend;
said blend for use as a tire or a tire component, having improved green strength so that said article maintains its shape until vulcanization.

17. A composition according to claim 16, wherein said dienes have from 4 to 6 carbon atoms and wherein said olefins are vinyl substituted aromatic compounds having from 8 to 12 carbon atoms.

18. A composition according to claim 17, wherein said diene-olefin copolymer contains an olefin ranging from about 0.1 to about 55 percent by weight of the copolymer and wherein the amount of said synthetic or natural cis-1,4-polyisoprene ranges from about 50 to about 90 percent by weight, and said polymerized synthetic elastomer ranges from about 10 percent to about 50 percent by weight based upon the total weight of said blend.

19. A composition according to claim 18, wherein said ionogenic compound is selected from the class consisting of acrylic acid or methacrylic acid, itaconic acid, fumaric acid, ethacrylic acid, propacrylic acid, and butacrylic acid;
wherein said metal of said metal base is zinc or magnesium;
oxide of said metal base is hydroxide or an oxide; and
wherein the amount of said metal base ranges from about 1.5 to about 5 parts by weight.

20. A composition according to claim 19, wherein said synthetic elastomer is selected from the class consisting of polybutadiene, polypiperylene, polyisoprene, poly(butadiene-co-piperylene), poly(butadiene-co-styrene), poly(butadiene-co-alpha-methylstyrene), and blends thereof, and wherein the amount of said ionogenic compound is such that said polymerized synthetic elastomer contains from 9 to about 35 milliequivalents of said

pendant group per 100 parts of weight of said polymerized synthetic elastomer.

21. A composition according to claim 20, wherein said blend is compounded.

22. A composition according to claim 20, wherein said unsaturated compound is selected from the class consisting of methacrylic acid and acrylic acid, wherein said metal of said metal base is zinc or magnesium, oxide of said metal base is hydroxide or an oxide, and wherein the amount of said metal base ranges from about 2 to about 5 parts by weight.

23. A composition according to claim 22, wherein the amount of said olefin in said dieneolefin copolymer ranges from about 10 percent to about 40 percent.

24. A composition according to claim 23, wherein said synthetic elastomer is selected from the class consisting of polybutadiene, poly(butadiene-co-styrene), and polyisoprene, wherein said metal base is zinc oxide or magnesium oxide, and wherein the amount of said ionogenic compound is such that said polymerized synthetic elastomer contains from about 9 to about 23 milliequivalents of said

pendant group per 100 parts by weight of said polymerized synthetic elastomer.

25. A composition according to claim 23, wherein said blend is compounded.

* * * * *